United States Patent
Mutha

(10) Patent No.: US 12,033,156 B2
(45) Date of Patent: *Jul. 9, 2024

(54) SYSTEMS AND METHODS FOR REMOVING POINT OF SALE PROCESSING FROM PCI SCOPE

(71) Applicant: Aurus, Inc., Boston, MA (US)

(72) Inventor: Rahul Mutha, Norwood, MA (US)

(73) Assignee: Aurus Inc., Norwood, MA (US)

( * ) Notice: Subject to any disclaimer, the term of this patent is extended or adjusted under 35 U.S.C. 154(b) by 246 days.

This patent is subject to a terminal disclaimer.

(21) Appl. No.: 16/934,568

(22) Filed: Jul. 21, 2020

(65) Prior Publication Data
US 2020/0349579 A1  Nov. 5, 2020

Related U.S. Application Data

(63) Continuation of application No. 16/396,108, filed on Apr. 26, 2019, now Pat. No. 10,810,597, which is a continuation of application No. 14/861,869, filed on Sep. 22, 2015, now Pat. No. 10,275,774, which is a
(Continued)

(51) Int. Cl.
| | |
|---|---|
| G06Q 20/40 | (2012.01) |
| G06Q 20/20 | (2012.01) |
| G06Q 30/06 | (2023.01) |
| G06Q 40/02 | (2023.01) |

(52) U.S. Cl.
CPC ....... *G06Q 20/40975* (2013.01); *G06Q 20/20* (2013.01); *G06Q 20/204* (2013.01); *G06Q 20/40* (2013.01); *G06Q 30/06* (2013.01); *G06Q 40/02* (2013.01); *G06Q 2220/10* (2013.01)

(58) Field of Classification Search
CPC .... G06Q 20/20; G06Q 30/0613; G06Q 20/10; G06Q 20/102; G06Q 20/1085; G06Q 30/02; G07F 7/1008; G07F 19/20
USPC ....... 705/16, 26.41, 39, 40, 28, 43; 235/375, 235/379, 380
See application file for complete search history.

(56) References Cited

U.S. PATENT DOCUMENTS

| | | |
|---|---|---|
| 5,978,840 A | 11/1999 | Nguyen et al. |
| 6,193,154 B1 | 2/2001 | Phillips |
| 6,282,522 B1 | 8/2001 | Davis et al. |

(Continued)

FOREIGN PATENT DOCUMENTS

WO   WO-2010/106365 A1   9/2010

OTHER PUBLICATIONS

"Application Programming Interface," Internet Payment Gateway Version 4.6, Application Programming Interface, Technical Documentation, AssureBuy, Inc. Jul. 17, 2006, 72 pages.
(Continued)

*Primary Examiner* — Olusegun Goyea
(74) *Attorney, Agent, or Firm* — Foley & Lardner LLP

(57) ABSTRACT

The methods and systems described herein provide for processing payments via a mobile device at a retail location while relying solely on non-PCI Scope information at the retail location. A payment processing transaction may be initiated at a point of sale at a retail location, and a unique identifier provided by a mobile device may be used as payment information to facilitate the processing of a payment transaction. Authorizations of payment processing transactions are made by a remotely located server based, at least in part, on the unique identifier provided by the mobile device.

18 Claims, 11 Drawing Sheets

Related U.S. Application Data continuation of application No. 13/302,045, filed on Nov. 22, 2011, now Pat. No. 9,171,304.

(56) References Cited

U.S. PATENT DOCUMENTS

| | | | |
|---|---|---|---|
| 7,110,744 B2 | 9/2006 | Freeny, Jr. | |
| 7,349,884 B1 | 3/2008 | Odom et al. | |
| 7,376,583 B1 | 5/2008 | Rolf | |
| 7,520,430 B1 | 4/2009 | Stewart et al. | |
| 7,606,762 B1 | 10/2009 | Heit | |
| 7,664,697 B2 | 2/2010 | Takayama | |
| 7,702,538 B2 | 4/2010 | Rau et al. | |
| 7,731,084 B2 | 6/2010 | Redick et al. | |
| 7,841,534 B2 | 11/2010 | Bacastow | |
| 7,870,022 B2 | 1/2011 | Bous et al. | |
| 7,873,566 B1* | 1/2011 | Templeton | G06Q 40/03 705/45 |
| 7,904,339 B2 | 3/2011 | Shah et al. | |
| 7,938,321 B2 | 5/2011 | Harrell | |
| 7,948,376 B2 | 5/2011 | Deline | |
| 8,554,688 B2 | 10/2013 | Harell et al. | |
| 2001/0056402 A1 | 12/2001 | Ahuja et al. | |
| 2003/0191709 A1* | 10/2003 | Elston | G06Q 20/04 705/40 |
| 2004/0103057 A1* | 5/2004 | Melbert | H04M 17/00 705/38 |
| 2004/0118914 A1* | 6/2004 | Smith | H04M 17/10 235/380 |
| 2005/0017068 A1 | 1/2005 | Zalewski et al. | |
| 2005/0051619 A1* | 3/2005 | Graves | G06Q 20/3552 235/380 |
| 2005/0268003 A1* | 12/2005 | Wang | H04L 67/02 710/36 |
| 2007/0011048 A1 | 1/2007 | Naito | |
| 2007/0022048 A1* | 1/2007 | Kingsborough | G06Q 30/0236 705/40 |
| 2007/0029376 A1 | 2/2007 | Stoutenburg et al. | |
| 2007/0040026 A1* | 2/2007 | Vleet | G06Q 20/20 235/383 |
| 2007/0052672 A1* | 3/2007 | Ritter | G02B 27/017 345/156 |
| 2007/0168282 A1 | 7/2007 | Giordano | |
| 2007/0272743 A1 | 11/2007 | Christie et al. | |
| 2008/0147514 A1 | 6/2008 | Shuster et al. | |
| 2008/0313028 A1 | 12/2008 | Williams et al. | |
| 2008/0313078 A1 | 12/2008 | Williams et al. | |
| 2009/0084840 A1 | 4/2009 | Williams et al. | |
| 2009/0099961 A1 | 4/2009 | Ogilvy | |
| 2009/0132424 A1 | 5/2009 | Kendrick et al. | |
| 2009/0132425 A1 | 5/2009 | Hogan et al. | |
| 2009/0159673 A1 | 6/2009 | Mullen et al. | |
| 2009/0171838 A1 | 7/2009 | Liu et al. | |
| 2009/0300762 A1* | 12/2009 | Yalakanti | H04L 63/1408 726/23 |
| 2009/0313131 A1 | 12/2009 | Giordano | |
| 2010/0049654 A1* | 2/2010 | Pilo | G06Q 20/10 705/43 |
| 2010/0050249 A1 | 2/2010 | Newman | |
| 2010/0051690 A1* | 3/2010 | Ling | G07F 17/16 235/380 |
| 2010/0161486 A1 | 6/2010 | Liu et al. | |
| 2010/0191653 A1 | 7/2010 | Johnson et al. | |
| 2010/0257067 A1 | 10/2010 | Chan | |
| 2010/0274678 A1* | 10/2010 | Rolf | G06Q 20/20 705/17 |
| 2010/0327054 A1* | 12/2010 | Hammad | G06Q 20/40 235/375 |
| 2010/0327056 A1* | 12/2010 | Yoshikawa | G06Q 20/4016 235/380 |
| 2011/0010289 A1* | 1/2011 | Kranzley | G06Q 20/322 707/769 |
| 2011/0022482 A1 | 1/2011 | Florek et al. | |
| 2011/0066513 A1 | 3/2011 | Fournier et al. | |
| 2011/0068168 A1* | 3/2011 | Graves | G06Q 20/04 235/379 |
| 2011/0218880 A1* | 9/2011 | Hammad | G06Q 20/40 705/26.41 |
| 2011/0238510 A1* | 9/2011 | Rowen | G06V 40/382 705/16 |
| 2012/0016518 A1* | 1/2012 | Saario | G06Q 20/18 700/232 |
| 2012/0130787 A1* | 5/2012 | Stouffer | G06Q 30/0238 705/14.1 |
| 2012/0130790 A1 | 5/2012 | Lyons et al. | |
| 2012/0197743 A1 | 8/2012 | Grigg et al. | |
| 2012/0221467 A1 | 8/2012 | Hamzeh et al. | |
| 2012/0317027 A1* | 12/2012 | Luk | G06Q 40/02 706/46 |
| 2013/0006776 A1 | 1/2013 | Miller et al. | |
| 2013/0191198 A1 | 7/2013 | Carlson et al. | |
| 2013/0212017 A1 | 8/2013 | Bangia | |
| 2013/0232019 A1 | 9/2013 | Frieden et al. | |
| 2013/0246171 A1 | 9/2013 | Carapelli | |
| 2014/0351072 A1* | 11/2014 | Wieler | G06Q 20/40 705/21 |
| 2015/0105920 A1 | 4/2015 | Carapelli et al. | |
| 2015/0120474 A1 | 4/2015 | Webb et al. | |

OTHER PUBLICATIONS

"Credit Card Merchant Services," Policies and Procedures, Business Manual—Accounting Services Section, University Of North Carolina at Chapel Hill, Jul. 2, 2009, http://WWW.UNC.edu/finance/busman/act/actpoll33.html, 10 pages.

Final Office Action on U.S. Appl. No. 14/861,869 dated May 18, 2018.

Final Office Action on U.S. Appl. No. 16/396,108 dated Mar. 26, 2020.

Non-Final Office Action on U.S. Appl. No. 16/396,108 dated Sep. 19, 2019.

Notice of Allowance on U.S. Appl. No. 13/485,490 dated Aug. 23, 2013.

Notice of Allowance on U.S. Appl. No. 14/861,869 dated Dec. 10, 2018.

Notice of Allowance on U.S. Appl. No. 16/396,108 dated Jun. 17, 2020.

U.S. Notice of Allowance on U.S. Appl. No. 13/302,045 dated Jun. 22, 2015.

U.S. Notice of Allowance on U.S. Appl. No. 13/485,490 dated Aug. 20, 2013.

U.S. Notice of Allowance on U.S. Appl. No. 14/462,164 dated May 11, 2015.

U.S. Notice of Allowance on U.S. Appl. No. 14/822,543 dated Apr. 28, 2016.

U.S. Office Action for U.S. Appl. No. 14/822,543, dated Dec. 17, 2015, 7 pages.

U.S. Office Action on 099762-0102 dated Mar. 12, 2014.

U.S. Office Action on U.S. Appl. No. 13/302,045 dated Jan. 14, 2015.

U.S. Office Action on U.S. Appl. No. 13/302,045 dated Mar. 11, 2014.

U.S. Office Action on U.S. Appl. No. 13/485,490 dated Dec. 12, 2012.

U.S. Office Action on U.S. Appl. No. 13/485,490 dated Aug. 13, 2012.

U.S. Office Action on U.S. Appl. No. 14/861,869 dated Dec. 28, 2017.

U.S. Office Action on U.S. Pat. No. 9,171,304 dated Aug. 5, 2014.

"Point-of-Sale A Beginners Guide to Computerized POS Software," The Small Business Depot, 2003 Courtesy of Bars & Stripes, Updated Nov. 29, 2005, 44 pages.

* cited by examiner

SYSTEMS AND METHODS FOR REMOVING POINT OF SALE PROCESSING FROM PCI SCOPE

CROSS REFERENCE TO RELATED APPLICATIONS

This application is a continuation application of and claims priority to U.S. application Ser. No. 16/396,108, filed on Apr. 26, 2019, and entitled "Systems and Methods for Removing Point of Scale Processing From PCI Scope", which in turn is a continuation of and claims priority to U.S. application Ser. No. 14/861,869, filed on Sep. 22, 2015, and entitled "Systems and Methods for Removing Point of Scale Processing From PCI Scope", which in turn is a continuation of and claims priority to U.S. application Ser. No. 13/302,045, filed Nov. 22, 2011, and entitled "Systems and Methods for Removing Point of Scale Processing From PCI Scope", all of which are hereby incorporated by reference in their entireties for all purposes.

BACKGROUND

Retailers, such as grocery stores, department stores, and restaurants, process thousands of credit card, debit card, and gift card transactions per day. One requirement for doing so is compliance with the Payment Card Industry Data Security Standard, also known as "PCI DSS," or simply "PCI". Ensuring that a retailer's payment processing computers, cash registers, back office servers, and credit card terminals comply with PCI can be time consuming and expensive. Various technical and non-technical standards and practices must be abided by for PCI compliance, and the retail location can be subject to frequent assessments and auditing.

Components of a retail system which handle secure payment information, also known as "cardholder data", must meet the requirements of PCI. These components may be referred to as "within PCI Scope". Components that do not handle secure payment information may be referred to as "outside PCI scope". Similarly, information whose processing and transmission would mandate that the hardware and software infrastructure handling said information fall within PCI scope may be referred to a "PCI scope information", whereas information whose processing would not subject the underlying infrastructure to PCI scope may be referred to as "non-PCI scope information".

Typically, a retail location which has more than one point of sale location, such as numerous check-out lanes at a department store or grocery store, generally has the following payment processing infrastructure: a cash register which provides a user the ability to sum the total amount of purchases for the transaction; a credit card terminal for inputting payment card information; and a back office server that manages the various cash registers and credit card terminals, and which is relied upon for the processing of payment transactions.

Restaurants may also similarly have multiple point of sale locations for effectuating the processing of payment transactions. Rather than a check-out lane, a waiter may take your payment card to a kiosk for processing the transaction. Said kiosks may similarly have a computer that may act as an electronic cash register and a credit card terminal. Sometimes, rather than a kiosk, a restaurant may have mobile wireless credit card terminals which a user may use to process a payment transaction.

In standard setups, the entirety of the retail location's payment system infrastructure must be within PCI scope, including the cash registers, the credit card terminals, and the back office computer systems. Often, the back office computer systems track transaction processing and are responsible for communicating with a remote authorization service in order to authorize the transaction. Since in traditional setups all of these items fall within PCI Scope, a retailer can be expected to spend substantial amounts of resources, time, and money in assuring PCI compliance across the entire system.

SUMMARY

Applicant has appreciated that available technology for processing payment transactions requires that retailers spend valuable resources and time on PCI compliance. Traditional systems and methods for processing payment transactions focus on securing and monitoring every aspect of a retailer's payment processing infrastructure, from the credit card terminals, to the cash registers, to the back office servers, and the network itself. Applicant has further appreciated that no available technology exists for transitioning existing multiple lane ("multi-lane") payment processing infrastructure into setups which remove the majority of the payment processing infrastructure from PCI scope; thereby substantially reducing costs and overhead on PCI compliance. Applicant has discovered that by effectively isolating a credit card terminal at a retail location, and substantially managing payment processing by a server at a location remote to a retail location in direct contact with a credit card terminal, substantial reductions in PCI compliance costs may be obtained.

Applicant has further appreciated that sensitive data, including information typically stored on payment cards, should be securely transmitted, stored, and processed.

In accordance with one embodiment of the invention, a back office server at a retail location may be in communication with a plurality of point of sale lanes and credit card terminals to effectuate the processing of payment transactions. The back office server may also communicate with a remotely located customer relationship management server to facilitate the use of customer loyalty programs, analytics, and receipt storage, tracking, and access. The plurality of credit card terminals are in direct communication with a remotely located payment processing server. The connection allowing communication between the credit card terminals and the back office server may be limited to a single port, such as a single isolated TCP/IP or UDP port. The remotely located payment processing server is responsible for communicating with an authorization server which may authorize or decline a particular payment processing transaction. The credit card terminal may communicate with the payment processing server over the public Internet, over a Virtual Private Network, or any form of wide area network. Communications may be additionally secured by firewalls disposed at either the retail location or remote location, or both. Additional security mechanisms, such as hardware monitoring devices which assure and prevent network tampering, may also be disposed at either the retail location, remote location, or both.

In some embodiments of the invention, a back office server at a retail location may be in communication with a single point of sale lane and a single credit card terminal to effectuate the processing of payment transactions. The single credit card terminal may be in direct communication with a remotely located payment processing server.

In accordance with a further embodiment of the invention, a method for processing payments is provided, the method comprising: receiving a request to process a payment transaction; determining that the request is associated with one of a plurality of credit card terminals at a retail location; receiving, by the determined credit card terminal, secure payment information; sending, by the determined credit card terminal, secure payment information to a remotely located server for authorization; and receiving, by the credit card terminal, an authorization from a remotely located server.

In some embodiments, a method for processing payments is provided, the method comprising: receiving a request to process a payment transaction; determining that the request is associated with a credit card terminal at a retail location; receiving, by the determined credit card terminal, secure payment information; sending, by the determined credit card terminal, secure payment information to a remotely located server for authorization; and receiving, by the credit card terminal, an authorization from a remotely located server. In accordance with a further embodiment of the invention, a method for processing payment transactions wherein the request to process a payment is received from a single point of sale lane at a retail location is provided. In accordance with a further embodiment of the invention, a method for processing payment transactions wherein the request to process a payment is received from a single electronic cash register at a retail location is provided.

In accordance with a further embodiment of the invention, a method for processing payment transactions further comprising the step of sending a request to a determined credit card terminal to initiate receipt of secure payment information is provided. In accordance with a further embodiment of the invention, a method for processing payment transactions wherein the request to process a payment is received from one of a plurality of point of sale lanes at a retail location is provided. In accordance with a further embodiment of the invention, a method for processing payment transactions wherein the request to process a payment is received from one of a plurality of electronic cash registers at a retail location is provided.

In accordance with a further embodiment of the invention, a method for processing payment transactions further comprising the additional steps of: determining that one of a plurality of point of sale lanes at a retail location is associated with an authorization; and sending the authorization to the determined point of sale lane is provided. In accordance with a further embodiment of the invention, a method for processing payment transactions comprising the additional steps of: determining that one of a plurality of electronic cash registers at a retail location is associated with the authorization; and sending the authorization to the determined electronic cash register is provided.

In some embodiments of the invention, a method for processing payment transactions further comprising the additional steps of: determining that a point of sale lane at a retail location is associated with an authorization; and sending the authorization to the determined point of sale lane is provided. In accordance with a further embodiment of the invention, a method for processing payment transactions further comprising the additional steps of determining that an electronic cash register at a retail location is associated with the authorization; and sending the authorization to the determined electronic cash register is provided.

In accordance with a further embodiment of the invention, a method for processing payment transactions wherein secure payment information is sent to a remotely located server through a firewall is provided.

In accordance with a further embodiment of the invention, a method for processing payment transactions wherein determining a credit card terminal associated with a request is based, at least in part, on a ticket associated with the request is provided. In accordance with a further embodiment of the invention, a method for processing payment transactions wherein determining a credit card terminal associated with a request is based, at least in part, on a table listing the associations of credit card terminals.

In accordance with a further embodiment of the invention, a method for processing payment transactions further comprising storing non-PCI scope payment transaction information in a database. In some embodiments, such non-PCI scope payment transaction information may be stored at the retail location. In some embodiments, such non-PCI scope payment transaction information may be stored at a remote location. In some embodiments, such non-PCI scope payment transaction information may be stored at both a retail location or remote location.

In accordance with a further embodiment of the invention, a method for processing payments is provided. A request to process a payment transaction is received by a back office server. The back office server determines that the request is associated with one of a plurality of credit card terminals at a retail location. The back office server sends a request to the determined credit card terminal to initiate the receipt of secure payment information to be applied to the requested transaction. The determined credit card terminal receives the request and initiates the receipt of secure payment information. The secure payment information is received by the credit card terminal, and may comprise credit card information, debit card information, associate personal identification number (PIN) information, gift card information, or loyalty program information. The credit card terminal sends the secure payment information to a remotely located payment processing server. The payment processing server manages the request and contacts a remotely located authorization server to authorize the payment. The remotely located payment processing server receives an authorization for the payment transaction, and sends the authorization to the credit card terminal. The credit card terminal receives the authorization from the remotely located server. The credit card terminal communicates the authorization, without sending secure payment information, to the back office server. The back office server determines that the authorization is associated with one of a plurality of point of sale lanes at the retail location. The back office server then communicates the authorization to one of a plurality of point of sale lanes at the retail location.

In accordance with a further embodiment of the invention, a method for processing payment transactions wherein a back office server operates in listening mode awaiting a request to process a payment transactions is provided.

In accordance with a further embodiment of the invention, a method for processing payment transactions further comprising the additional steps of: determining, based at least in part on payment information, that a customer belongs to a loyalty program; and applying loyalty program information to a requested transaction. The step of determining that a customer belongs to a loyalty program may be performed at a remotely located server, or at a back office server at a retail location.

In accordance with a further embodiment of the invention, a method for processing payment transactions further comprises determining, based at least in part on payment information, a token for a customer. The token may be used as a universal identifier for a customer which does not contain PCI scope information.

In accordance with a further embodiment of the invention, a method for processing payment transactions further comprises storing receipt information for the payment transaction. Receipt information may be stored at a remote location, or at a back office server.

In accordance with a further embodiment of the invention, a system for processing payment transactions is provided, the system comprising: at least one processing unit communicatively coupled to a memory unit capable of storing processor-executable instructions, wherein upon execution of the processor-executable instructions, the at least one processing unit: receives a request to process a payment transaction, and determines that the request is associated with one of a plurality of credit card terminals at a retail location; and a determined credit card terminal comprising at least one processing unit communicatively coupled to a memory unit capable of storing processor-executable instructions, wherein upon execution of the processor executable instructions, the at least one processing unit: receives secure payment information, sends secure payment information to a remotely located server for authorization, and receives an authorization from a remotely located server.

In accordance with a further embodiment of the invention, at least one non-transitory compute readable medium is provided, encoded with a plurality of instructions that, when executed, perform a method for processing payment transactions. The method may comprise: receiving a request to process a payment transaction; determining that the request is associated with one of a plurality of credit card terminals at a retail location; receiving, by the determined credit card terminal, secure payment information; sending, by the determined credit card terminal, secure payment information to a remotely located server for authorization; and receiving, by the credit card terminal, an authorization from a remotely located server.

In accordance with some embodiments of the invention, any embodiment which may involve a plurality of credit card terminals, point of sale lanes, or electronic cash registers may alternatively involve a single credit card terminal, point of sale lane, or electronic cash register. In some embodiments, there may be a single credit card terminal but a plurality of point of sale lanes or electronic cash registers. In some embodiments, there may be a single point of sale lane but a plurality of credit card terminals and electronic cash registers. In some embodiments, there may be a single electronic cash register but a plurality of credit card terminals and point of sale lanes.

BRIEF DESCRIPTION OF THE FIGURES

The foregoing and other objects, aspects, features, and advantages of the disclosure will become more apparent and better understood by referring to the following description taken in conjunction with the accompanying drawings, in which.

DETAILED DESCRIPTION

Figure 1:
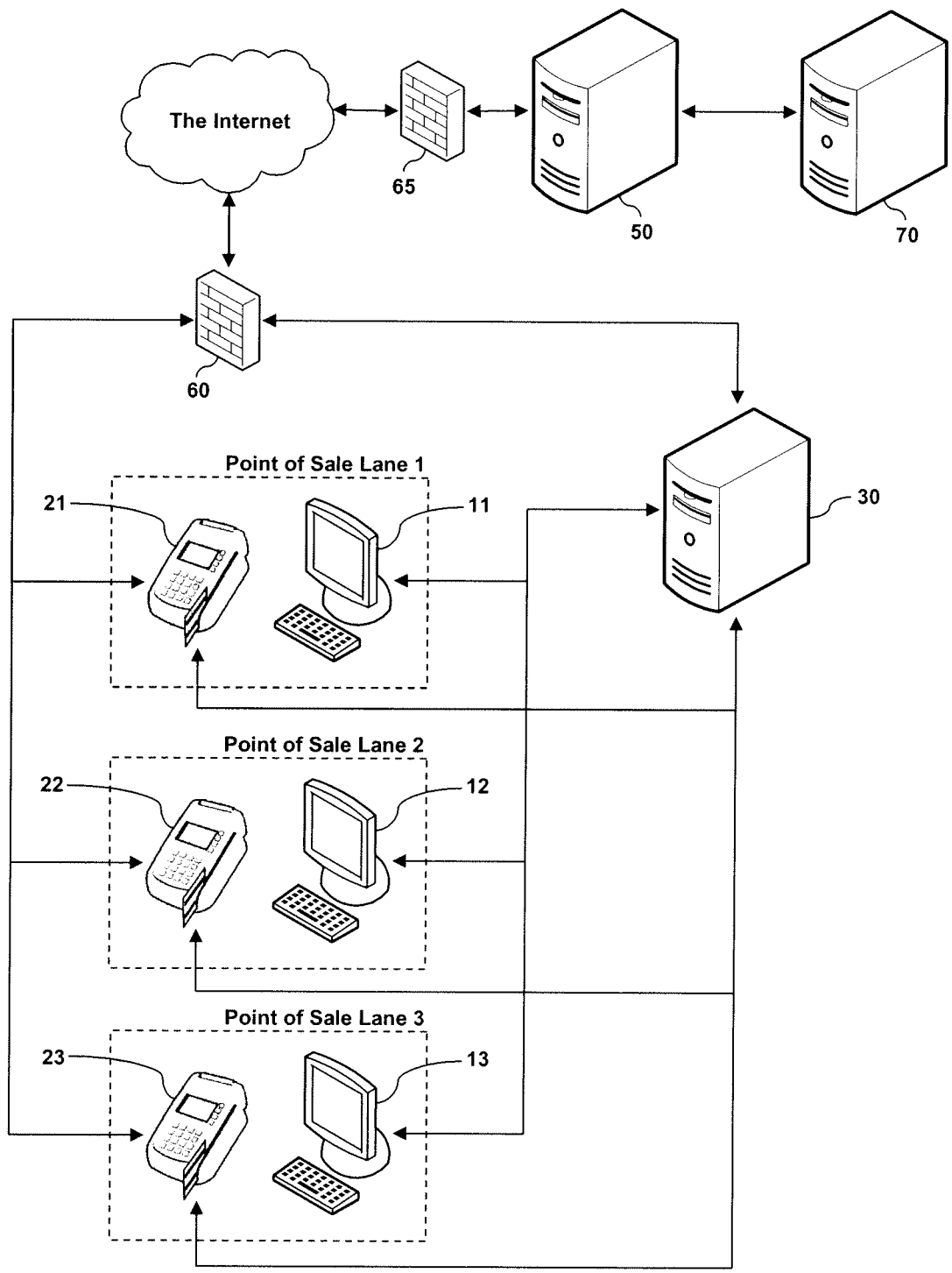
FIG. 1 is a block diagram of a system for processing payment transactions.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

In reference now to FIG. 1, a system for processing payment transactions is shown. Point of sale lanes 1, 2, and 3 are in communication with back office server 30. Point of sale lanes may be comprised of any form and combination of point of sale hardware and software, including electronic cash registers, checkout terminals, checkout kiosks, computers, wireless checkout terminals, restaurant ordering kiosks, customized desktop computers, laptops, wireless devices, tablet PCs, smart phones, or any other computing device capable of assisting with payment processing at a retail location. A point of sale lane may be a check-out lane or counter at a department store, grocery store, or other form of retail shopping locations, or it may be a kiosk at a restaurant or counter at a food service retail location, or any other location where a user effectuates the processing of a payment transaction. Back office server 30 may be a single server, a plurality of servers, a server farm, or an allocation of computing services provided by a cloud based provider of computer services. In some embodiments, server 30 may be a plurality of servers operated by a plurality of different parties, entities, and service providers. The back office server 30 may be located at the retail location or at a remote location.

In some embodiments, point of sale lanes may comprise electronic cash registers 11, 12, and 13, which are in communication with the back office server 30. Electronic cash registers 11, 12 and 13, may be any form of computing device capable of assisting a user in effectuating the processing of a payment transaction. Electronic cash registers may be any one of or combination of point of sale hardware and software, computerized cash register, checkout terminals, checkout kiosks, computers, wireless checkout terminals, wireless computers, restaurant ordering kiosk computers, checkout kiosk computers, payment processing kiosk computers, customized desktop computers, laptops, wireless devices, tablet PCs, smart phones, iPhones or iPads as provided by the Apple Corporation, or any other computing device capable of assisting a user with payment processing at a retail location. In some embodiments, communications between electronic cash registers 11, 12, and 13 and server 30 are encrypted. In some embodiments, communications between electronic cash registers 11, 12, and 13 and server 30 are encrypted using public-private key encryption. In some embodiments, communications between electronic cash registers 11, 12, and 13 and server 30 are encrypted using shared secret key encryption. In some embodiments, communications between electronic cash registers 11, 12, and 13 and server 30 are encrypted using Secure Socket Layer (SSL) or Transport Layer Security (TLS) protocols. In some embodiments, communications between electronic cash registers 11, 12, and 13 and server 30 are encrypted using a proprietary encryption scheme. In some embodiments, communications between electronic cash registers 11, 12, and 13 and server 30 may occur, at least in part, wirelessly.

The back office server 30 is in communication with credit card terminals 21, 22 and 23 which are located at the point of sale lanes. In some embodiments, the communication between credit card terminals 21, 22, and 23 and server 30 may be limited to a single isolated port for communication of non-PCI scope information. In some embodiments the single isolated port may be a TCP/IP or UDP port. In some embodiments, communications between credit card terminals 21, 22, and 23 and server 30 are encrypted. In some embodiments, communications between credit card terminals 21, 22 and 23 and server 30 are encrypted using public-private key encryption. In some embodiments, communications between credit card terminals 21, 22 and 23 and server 30 are encrypted using shared secret key encryption. In some embodiments, communications between credit card terminals 21, 22 and 23 and server 30 are encrypted using Secure Socket Layer (SSL) or Transport Layer Security (TLS) protocols. In some embodiments, communications between credit card terminals 21, 22 and 23 and server 30 are encrypted using a proprietary encryption scheme. In some embodiments, communications between credit card terminals 21, 22 and 23 and server 30 may occur, at least in part, wirelessly.

In some embodiments, communications between credit card terminals 21, 22 and 23 and server 30 may be made utilizing dial-up communications, the Internet, TCP/IP, UDP, General packet radio service (GPRS) communications, cellular communications, WiFi, wireless communications utilizing the IEEE 802.11 standards, other forms of wireless communications, ethernet, or any other form of communications protocol, channel, or standard.

The credit card terminals 21, 22, and 23 are also in communication with a remotely located payment processing server 50. Server 50 may be a single server, a plurality of servers, a server farm, or an allocation of computing services provided by a cloud based provider of computer services. In some embodiments, server 50 may be a plurality of servers operated by a plurality of different parties, entities, and service providers. In some embodiments, the communication between credit card terminals 21, 22, and 23 and remotely located payment processing server 50 goes through one or both of firewalls 60 and 65. In some embodiments, the communication between credit card terminals 21, 22, 23 and remote server 50 may be additionally monitored by other software or hardware based network monitoring tools. In some embodiments, such network monitoring tools may assure that communications between the credit card terminals and server 50 are not tampered with. In some embodiments, communications between credit card terminals 21, 22, and 23 and server 50 are encrypted. In some embodiments, communications between credit card terminals 21, 22 and 23 and server 50 are encrypted using public-private key encryption. In some embodiments, communications between credit card terminals 21, 22 and 23 and server 50 are encrypted using shared secret key encryption. In some embodiments, communications between credit card terminals 21, 22 and 23 and server 50 are encrypted using Secure Socket Layer (SSL) or Transport Layer Security (TLS) protocols. In some embodiments, communications between credit card terminals 21, 22 and 23 and server 50 are encrypted using a proprietary encryption scheme.

In some embodiments, communications between credit card terminals 21, 22, and 23 and remotely located payment processing server 50 may be made utilizing dial-up communications, the Internet, TCP/IP, UDP, General packet radio service (GPRS) communications, cellular communications, WiFi, wireless communications utilizing the IEEE 802.11 standards, other forms of wireless communications, ethernet, or any other form of communications protocol, channel, or standard.

In some embodiments, credit card terminals (CCT) 21, 22 or 23 may be terminals that allow customers to swipe or otherwise input credit card information with which to effectuate a payment transaction. In some embodiments, CCTs 21, 22, or 23 may be terminals that allow customers to input any form of payment information that is not credit card information. In some embodiments, CCTs 21, 22, or 23 may be terminals that allow customers to input gift card information, bank account information, or debit card information. In some embodiments, CCTs 21, 22, or 23 may be terminals that allow customers to input payment information from an online payment service provider such as PayPal. In some embodiments, CCTs 21, 22, or 23 may be terminals that allow customers to input payment information from a rewards program. For example, a user may input rewards program information and use points or credits to effectuate the payment transaction.

In some embodiments, CCTs 21, 22, or 23 may be terminals that allow customers to input information wirelessly. In some embodiments, CCTs 21, 22, or 23 may be terminals that allow customers to input information through a Radio-Frequency Identification (RFID) device or chip. In some embodiments CCTs 21, 22, or 23 may be terminals that allow customers to input information through a touch pad or key pad. In some embodiments, CCTs 21, 22, or 23 may be terminals that allow customers to input information by swiping a card with a magnetic strip. In some embodiments, CCTs 21, 22, or 23 may be terminals that allow customers to input information by entering in a unique identifier or password.

In some embodiment, CCTs 21, 22, or 23 may be terminals that allow customers to input payment information via their cell phones or other mobile device.

In some embodiments, server 50 is in communication with authorization server 70. Server 70 may be a single server, a plurality of servers, a server farm, or an allocation of computing services provided by a cloud based provider of computer services. In some embodiments, server 70 may be a plurality of servers operated by a plurality of different parties, entities, and service providers. In some embodiments, communications between server 50 and server 70 are encrypted. In some embodiments, communications between server 50 and server 70 are encrypted using public-private key encryption. In some embodiments, communications between server 50 and server 70 are encrypted using shared secret key encryption. In some embodiments, communications between server 50 and server 70 are encrypted using Secure Socket Layer (SSL) or Transport Layer Security (TLS) protocols. In some embodiments, communications between server 50 and server 70 are encrypted using a proprietary encryption scheme. In some embodiments, communications between server 50 and server 70 may occur, at least in part, wirelessly.

In some embodiments, communications between credit card terminals 21, 22 and 23 and remotely located server 50 occur across the public Internet. In some embodiments, communications between credit card terminals 21, 22 and 23 and remotely located server 50 occur across a virtual private network (VPN). In some embodiments, communication between credit card terminals 21, 22 and 23 and remotely located server 50 occur across any form of wide area network. In some embodiments, communications between credit card terminals 21, 22 and 23 and remotely located server 50 occur across a private network. In some embodiments, communications between credit card terminals 21, 22 and 23 and remotely located server 50 may occur, at least in part, wirelessly.

In some embodiments, back office server 30 may be in communication with remotely located payment processing server 50. In some embodiments, the communication between server 30 and remotely located payment processing server 50 goes through one or both of firewalls 60 and 65. In some embodiments, communications between server 30 and server 50 are encrypted. In some embodiments, communications between server 30 and server 50 are encrypted using public-private key encryption. In some embodiments, communications between server 30 and server 50 are encrypted using shared secret key encryption. In some embodiments, communications between server 30 and server 50 are encrypted using Secure Socket Layer (SSL) or Transport Layer Security (TLS) protocols. In some embodiments, communications between server 30 and server 50 are encrypted using a proprietary encryption scheme.

In some embodiments, server 30, 50 and 70 may be in communication with additional storage devices or databases.

Figure 2:
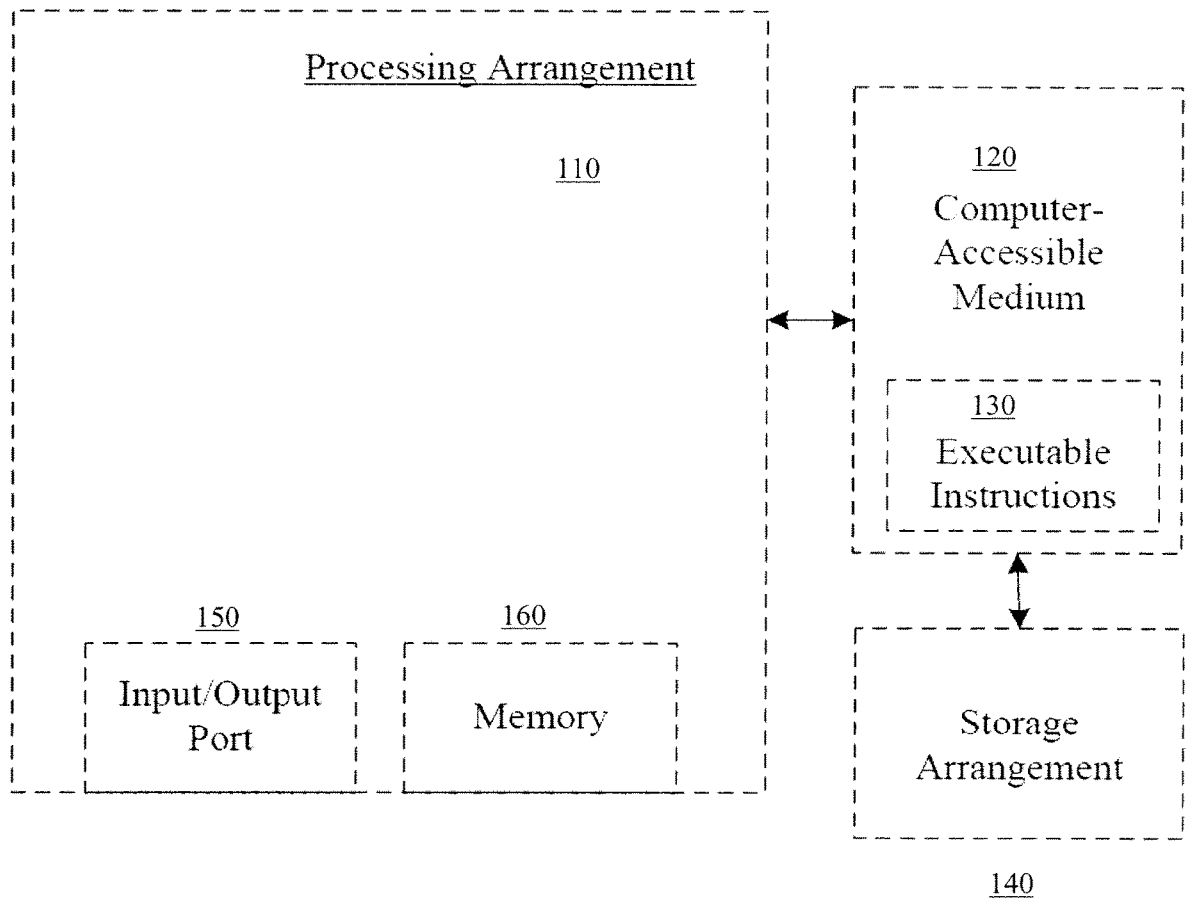
FIG. 2 is a block diagram of an exemplary embodiment of a system for executing computer executable instructions performed by processing arrangement and/or a computing arrangement, according to one embodiment of the present disclosure.

In reference now to FIG. 2, a block diagram of an exemplary embodiment of a system capable of implementing the present disclosure is shown. For example, an exemplary procedure in accordance with the present disclosure can be performed by a processing arrangement 110 and/or a computing arrangement 110. Such processing/computing arrangement 110 can be, e.g., entirely or a part of, or include, but not be limited to, a computer/processor that can include, e.g., one or more microprocessors, and use instructions stored on a computer-accessible medium (e.g., RAM, ROM, hard drive, or other storage device).

As shown in FIG. 2 a computer-accessible medium 120 (e.g., as described herein, a storage device such as a hard disk, floppy disk, memory stick, CD-ROM, RAM, ROM, etc., or a collection thereof) can be provided (e.g., in communication with the processing arrangement 110). The computer-accessible medium 120 may be a non-transitory computer-accessible medium. The computer-accessible medium 120 can contain executable instructions 130 thereon. In addition or alternatively, a storage arrangement 140 can be provided separately from the computer-accessible medium 120, which can provide the instructions to the processing arrangement 110 so as to configure the processing arrangement to execute certain exemplary procedures, processes and methods, as described herein, for example.

Figure 3:
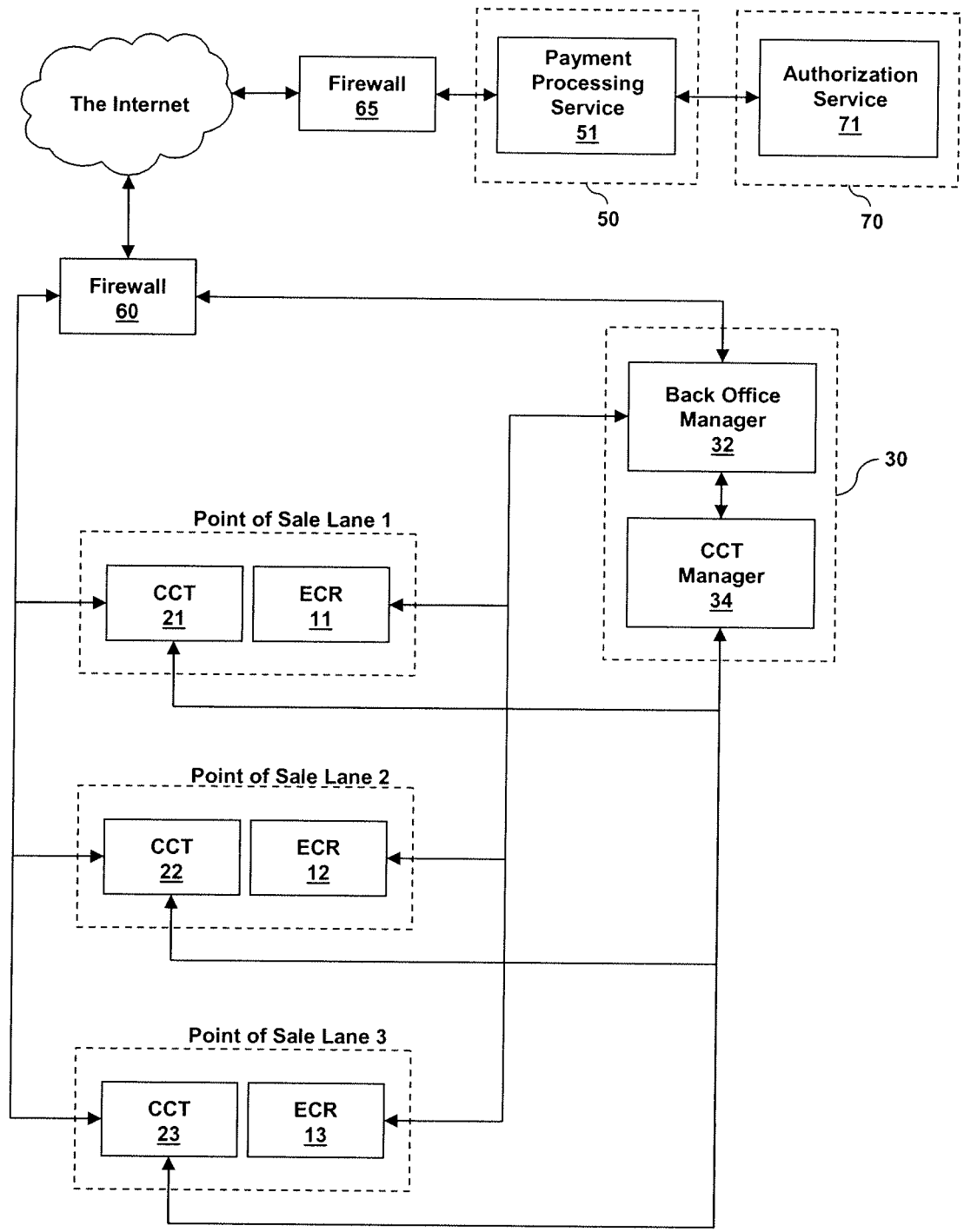
FIG. 3 is a block diagram of a system for processing payment transactions.

In reference now to FIG. 3, back office server 30 is comprised of a back office manager 32 and a credit card terminal (CCT) manager 34. The back office manager 32 may be any computing processor or portion thereof programmed to perform the functions of a back office manager. The CCT manager 34 may be any computing processor or portion thereof programmed to perform the functions of a CCT manager. In some embodiments, the back office manager 32 and CCT manager 34 may comprise a single joint back office manager and CCT manager. In some embodiments, the functions of the CCT manager 34 may be performed by the back office manager 32. In some embodiments, the CCT manager 34 may perform the functions of the back office manager. The back office manager may be in communication with electronic cash registers (ECR) 11, 12, and 13. The back office manager may be in communication with a payment processing server 51 on remote server 50. The payment processing service 51 may be any computing processor or portion thereof programmed to perform the functions of payment processing service. The payment processing service 51 may comprise of a payment gateway. The payment processing service 51 may be a payment gateway.

In some embodiments, the CCT manager 34 is in communication with the back office manager 32, and vice-versa. The CCT manager is further in communication with CCTs 21, 22, and 23. CCTs 21, 22, and 23 are in communication with a payment processing service 51 on remote server 50. In some embodiments, communications between payment CCTs 21, 22, and 23 and payment processing service 51 are routed through one or both of firewalls 60 and 65.

In some embodiments, payment processing service 51 is in communication with authorization service 71 on server 70. The authorization service 51 may be any computing processor or portion thereof programmed to perform the functions of the authorization service. Authorization service 71 may be comprised of a payment gateway. Authorization service 71 may be a payment gateway. In some embodiments, payment processing service 51 and authorization service 71 may be a single service.

In any embodiment, communications between various components of the payment processing system may be made utilizing either one or a plurality of: dial-up communications, the Internet, TCP/IP, UDP, General packet radio service (GPRS) communications, cellular communications, WiFi, wireless communications utilizing the IEEE 802.11 standards, other forms of wireless communications, ethernet, a packet-switched network, or any other form of communications protocol, channel, or standard.

Figure 4:
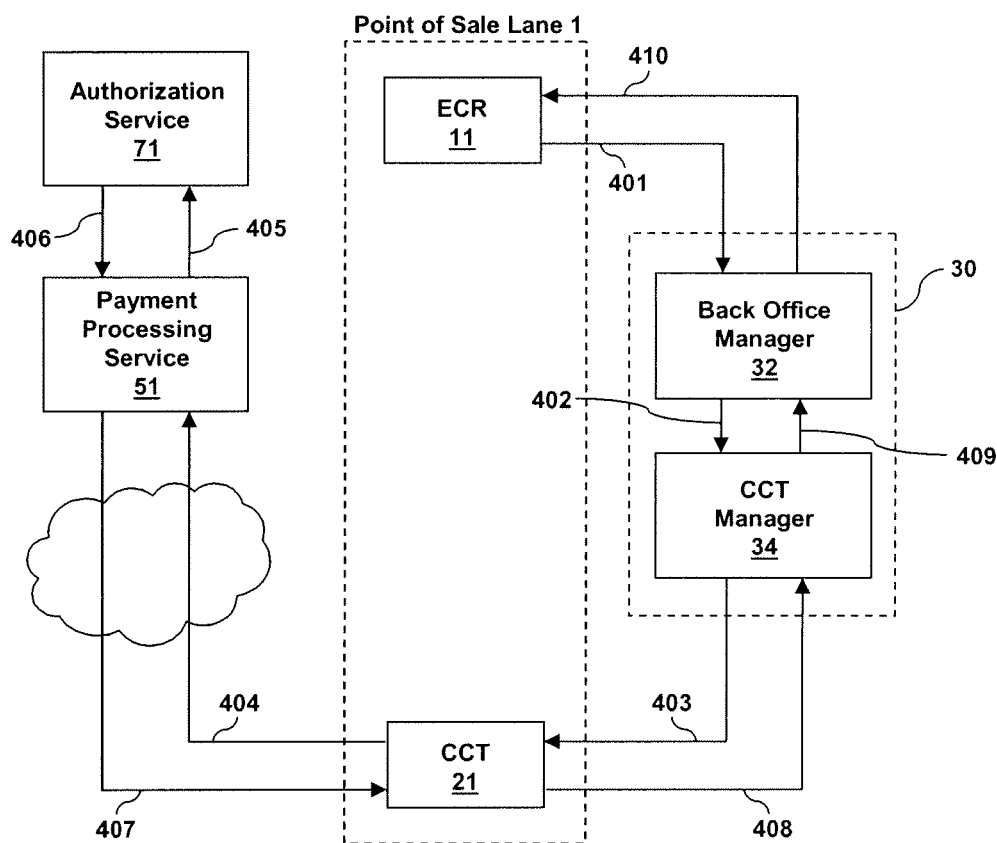
FIG. 4 is a block diagram demonstrating the flow of a method for processing payment transactions.

In reference now to FIG. 4, a flow diagram for processing a payment transaction in the context of the present disclosure is shown. Back office manager 32 receives 401 a request to process a payment transaction from ECR 11. The back office manager 32 may validate and check the request to determine whether the request is consistent with payment processing requirements, and transmits the request to CCT manager 34. CCT manager 34 receives 402 the request from back office manager 32. CCT manager 34 may determine that CCT 21 is associated with the request for processing a payment transaction. CCT manager 34 may send 403 a request to CCT 21 to initiate the receipt of secure payment information. CCT 21 may receive secure payment information from a user, comprising credit card information, debit card information, Personal Identification Number (PIN) information, gift card information, or loyalty program information. CCT 21 sends 404 a request to payment processing service 51 to authorize the payment transaction. Payment processing service 51 receives the request to authorize the transaction, and sends 405 a request to authorization service 71 to authorize the transaction. Payment processing service 51 receives 406 an authorization for the payment transaction from authorization service 71. An authorization may be any form of computer readable indicator that the payment transaction has been authorized or approved by an authorization service. CCT 21 receives 407 an authorization from payment processing service 51 and sends an authorization to CCT Manager 34 which does not include PCI scope information. CCT Manager 34 receives 408 an authorization from CCT 21, which does not include PCI scope information. The CCT manager sends an authorization to back office manager 32. Back office manager 32 receives 409 an authorization from CCT Manager 34. Back office manager 32 sends 410 an authorization for the payment transaction to ECR 11.

In some embodiments, back office manager 32 may operate in listening mode, whereby it periodically determines whether a request to process a payment transaction has been received, or whether an authorization or other message has been received. In some embodiments, back office server 30 may operate entirely in listening mode, whereby it periodically determines whether a request, authorization, message, or signal has been received. In some embodiments, at least one module or process running on back office server 30 may operate in listening mode while other modules or processes do not operate in listening mode. In some embodiments, CCT Manager 34 may operate in listening mode, whereby it periodically determines whether a request to process a payment transaction has been received, or whether an authorization or other message has been received. In some embodiments CCT 21 may operate in listening mode, whereby it periodically determines whether a request to process a payment transaction has been received, or whether an authorization or other message has been received. In some embodiments ECR 11 may operate in listening mode, whereby it periodically determines whether a request to process a payment transaction has been received, or whether an authorization or other message has been received. In some embodiments, the periodicity with which a device, module, or process operates in listening mode may be so short so as to allow an action to be taken in response to receiving a request, authorization, or message nearly instantaneously.

In some embodiments, an authorization may be a secure packet of information indicating that the payment has been authorized. In some embodiments, an authorization may be an unsecure packet of information indicating that the payment has been authorized. In some embodiments, an authorization may be an address in memory that indicated that a payment has been authorized. In some embodiments, an authorization may be an electronic message that indicated that a payment has been authorized. In some embodiments, and authorization may be a request that the credit card terminal complete the payment processing transaction. In some embodiments, an authorization may change format between Authorization Service 71, Payment Processing Service 51, Firewall 65, Firewall 60, CCT 21, CCT Manager 34, Back Office Manager 32, and ECR 11. For example, an authorization received by Payment Processing Service 51 may be a request by Authorization Service 71 for Payment Processing Service 51 to effectuate the processing of the payment transaction. In turn, Payment Processing Service 51 may communicate the authorization to CCT 21 in the form of a request for CCT 21 to effectuate the processing of a payment transaction. In turn, CCT 21 may communicate an authorization to CCT Manager 34 in the form of a message to CCT Manager 34 informing CCT Manager 34 that the transaction has been authorized. In turn, CCT Manager 34 may communicate an authorization to Back Office Manager 32 in the form of a request to Back Office Manager 32 to effectuate the processing of a payment transaction. In turn, Back Office Manager 32 may communicate an authorization to ECR 11 in the form of a request to ECR 11 to effectuate the processing of a payment transaction, such as a request to print out a receipt for a customer. In an alternative embodiment, an authorization may be a single packet of data, file, or message which is sent from Authorization Service 71, and forwarded to Payment Processing Service 51, then forwarded to CCT 21, then forwarded to CCT Manager 34, then forwarded to Back Office Manager 32, and forwarded to ECR 11.

In some embodiments, an authorization may be communicated across a different communications link than that on which a request for authorization is communicated.

Figure 5A:
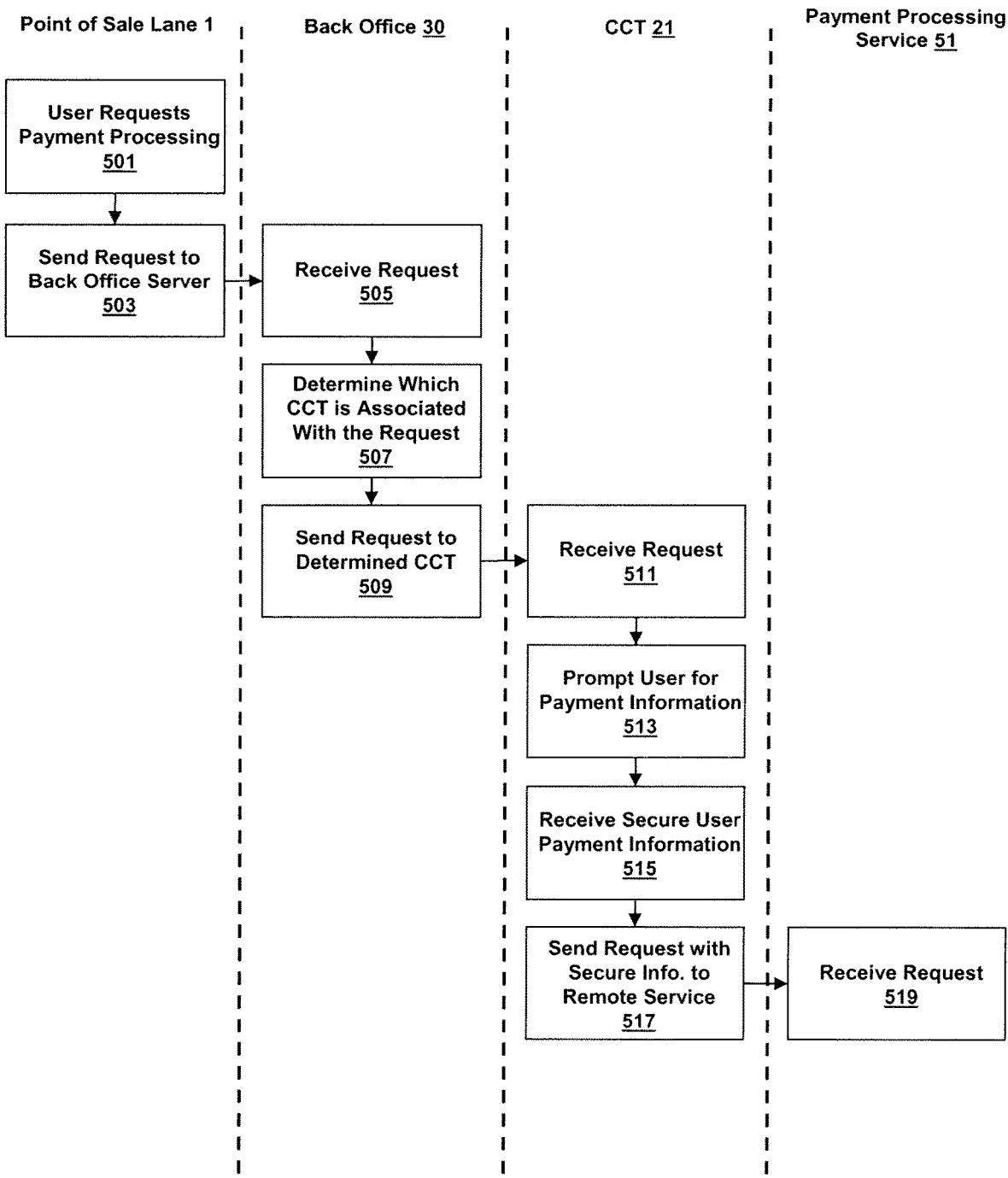
FIG. 5A is a flow diagram of a method for processing payment transactions.

In reference now to FIG. 5A, a flow diagram for a method for processing payment transactions is depicted. At a point of sale lane, a user requests 501 processing of a payment transaction. Further at the point of sale, a request is sent 503 to the back office server 30 to effectuate the processing of the payment transaction. Back office server 30 receives 505 a request to process a payment transaction. Back office server 30 determines 507 which of a plurality of CCTs at a retail location is associated with the request. Back office server 30 sends 509 a request to the determined CCT to effectuate payment processing. The determined CCT 21 receives 511 the request to effectuate payment processing. The determined CCT 21 prompts 513 a user to enter payment information. Payment information may be comprised of credit card information, debit card information, PIN information, gift card information, or loyalty program information. The determined CCT 21 receives 515 secure user payment information. The determined CCT sends 517 secure payment information to remotely located payment processing service 51 along with a request to authorize the payment transaction. Remote payment processing service 51 receives 519 the payment information and request for authorizing the payment transaction.

Figure 5B:
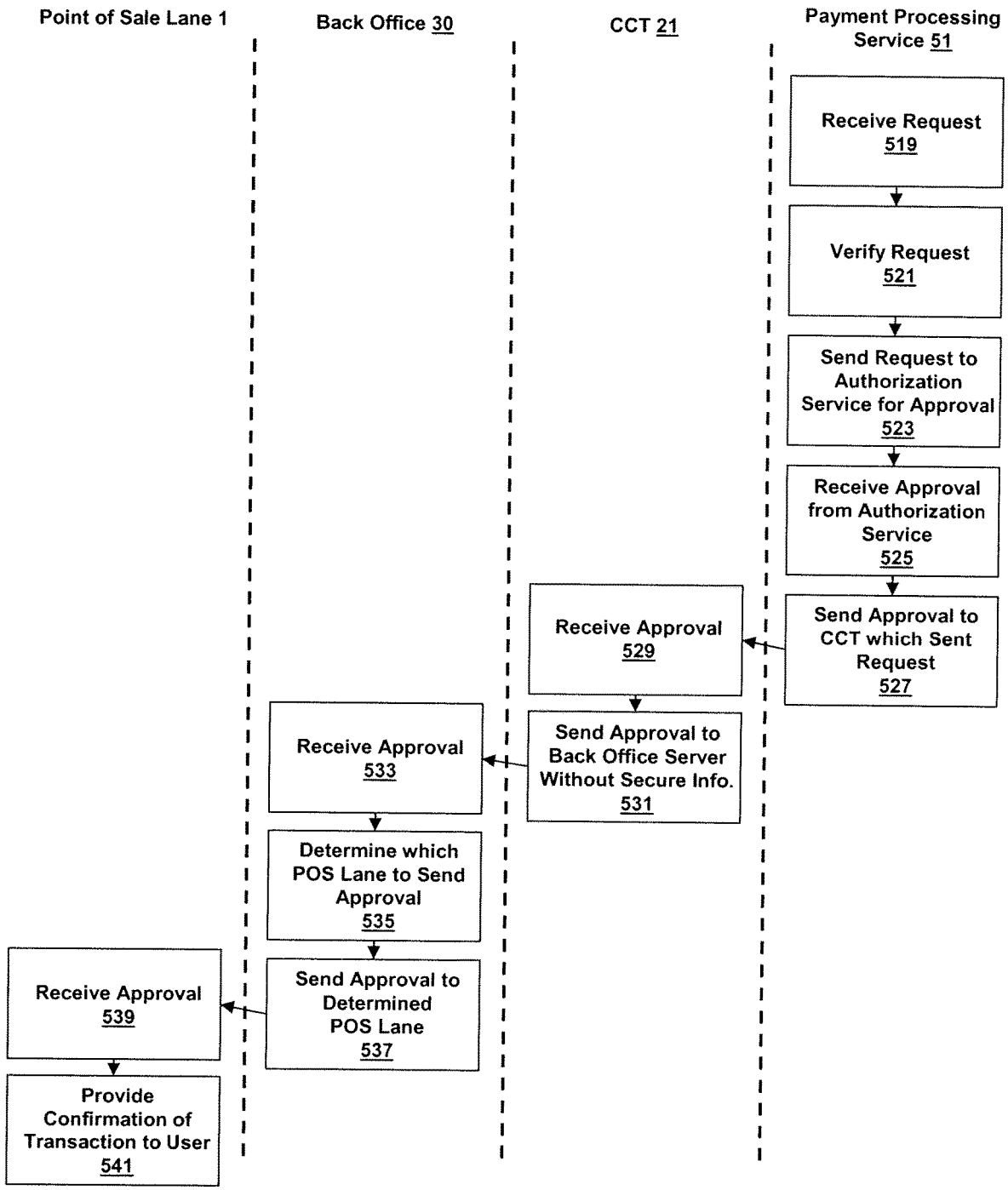
FIG. 5B is a flow diagram of a method for processing payment transactions.

In reference now to FIG. 5B, a flow diagram for a method for processing payment transactions is depicted. Payment processing service 51 receives 519 the payment information and request for authorizing the payment transaction. Payment processing service 51 verifies 521 the request. Payment processing service 51 sends 523 a request for authorization of the payment transaction to authorization service 71 for approval. Payment processing service 51 receives 525 an approval or authorization for the payment transaction from the authorization service 71. Payment processing service 51 sends 527 an approval or authorization for the payment transaction to the determined CCT 21. The determined CCT 21 receives 529 an approval or authorization for the payment transaction. The determined CCT 21 sends 531 an approval or authorization to back office server 30 without PCI scope information. Back office server 30 receives 533 an approval or authorization for the payment transaction without PCI scope information. Back office server 30 determines 535 that one of a plurality of point of sale lanes is associated with the approval or authorization. Back office server 30 sends 541 an approval or authorization to the determined point of sale lane. At the point of sale lane, an approval or authorization is received 539. At the point of sale lane, a confirmation of the payment transactions is provided 541 to a user.

Figure 6A:
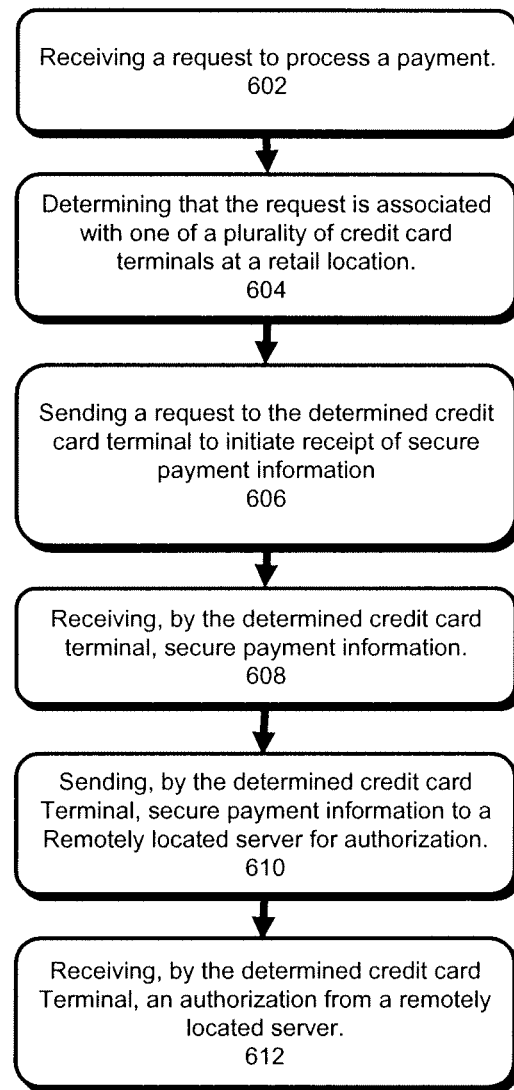
FIG. 6A-B are flow diagrams of methods for processing payment transactions.

In reference now to FIG. 6A, a method for processing payment transactions is shown. A request to process a payment is received 602. A determination 604 is made that the request is associated with one of a plurality of credit card terminals at a retail location. A request is sent 606 to the determined credit card terminal to initiate receipt of secure payment information. The determined credit card terminal receives 608 secure payment information. The determined credit card terminal sends 610 the secure payment information to a remotely located server for authorization. The determined credit card terminal receives 612 an authorization from a remotely located server.

In some embodiments, a request to process a payment is received. A determination is made that the request is associated with a credit card terminal at a retail location. A request is sent to the determined credit card terminal to initiate receipt of secure payment information. The determined credit card terminal received secure payment information. The determined credit card terminal sends the secure payment information to a remotely located server for authorization. The determined credit card terminal receives an authorization from a remotely located server.

Figure 6B:
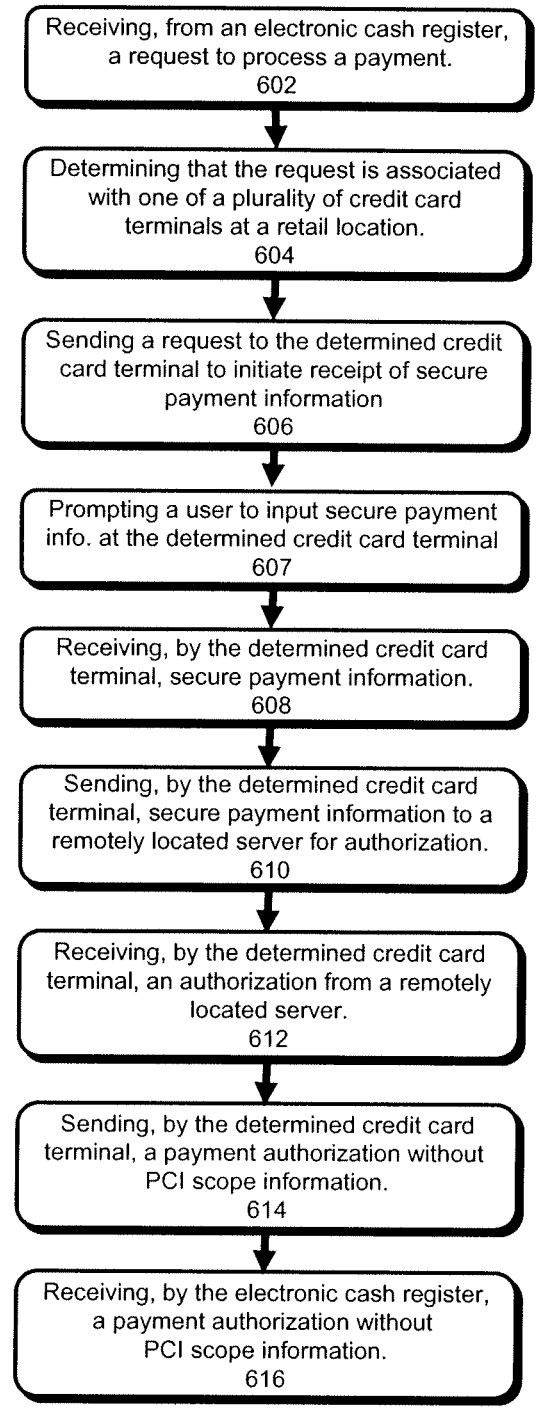

In reference now to FIG. 6B, a method for processing payment transactions is shown. A request to process a payment is received 602 from an electronic cash register. A determination 604 is made that the request is associated with one of a plurality of credit card terminals at a retail location. A request is sent 606 to the determined credit card terminal to initiate receipt of secure payment information. A user is prompted 607 to input secure payment information at the determined credit card terminal. The determined credit card terminal receives 608 the secure payment information. The determined credit card terminal sends 610 the secure payment information to a remotely located server for authorization. The determined credit card terminal receives 612 an authorization from the remotely located server. The determined credit card terminal sends 614 a payment authorization without PCI scope information. The electronic cash register receives 616 a payment authorization without PCI scope information.

Figure 7A:
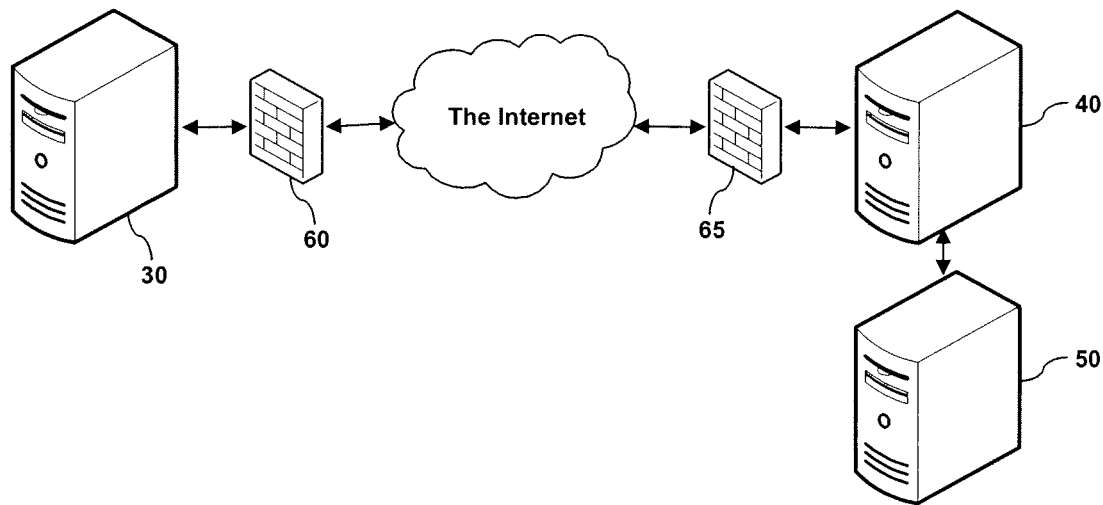
FIG. 7A-B are block diagrams of systems for managing client relationships in conjunction with systems for processing payment transactions.

In reference now to FIG. 7A, a system for managing customer relationships in the context of processing payment transactions is depicted. Back office server 30 is in communication with customer relationship management (CRM) server 40. Server 40 may be a single server, a plurality of servers, a server farm, or an allocation of computing services provided by a cloud based provider of computer services. In some embodiments, server 40 may be a plurality of servers operated by a plurality of different parties, entities, and service providers. Server 40 may also be in communication with payment processing server 50. In some embodiments, communications between server 30 and server 40 are encrypted. In some embodiments, communications between server 30 and server 40 are encrypted using public-private key encryption. In some embodiments, communications between server 30 and server 40 are encrypted using shared secret key encryption. In some embodiments, communications between server 30 and server 40 are encrypted using Secure Socket Layer (SSL) or Transport Layer Security (TLS) protocols. In some embodiments, communications between server 30 and server 40 are encrypted using a proprietary encryption scheme. In some embodiments, communications between server 30 and server 40 may occur, at least in part, wirelessly.

In some embodiments, communications between back office server 30 and CRM server 40 may occur through one or both of firewalls 60 and 65. Communication between server 30 and server 40 may occur across the public Internet. In some embodiments, communications between server 30 and server 40 occur across a virtual private network (VPN). In some embodiments, communication between server 30 and server 40 occur across any form of wide area network. In some embodiments, communications between server 30 and server 40 occur across a private network. In some embodiments, communications between server 30 and server 40 may occur, at least in part, wirelessly.

Figure 7B:
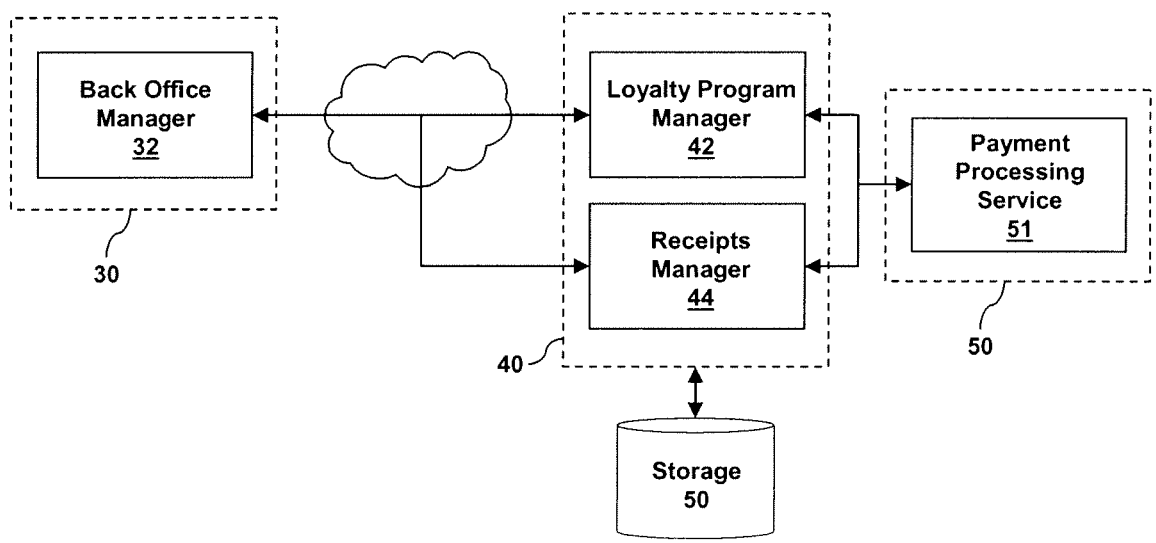

In reference now to FIG. 7B, a system for managing customer relationships in the context of processing payment transactions is depicted. A CRM server 40 is comprised of a loyalty program manager 42 and a receipts manager 44. The loyalty program manager 42 may be any computing processor or portion thereof programmed to perform the functions of a loyalty program manager. The receipts manager 44 may be any computing processor or portion thereof programmed to perform the functions of a receipts manager. In some embodiments the loyalty program manager 42 and receipts manager 44 may comprise a single joint loyalty program and receipts manager. In some embodiments, the functions of the loyalty program manager may be performed by the receipts manager 44. In some embodiments, the loyalty program manager 42 may perform the functions of the receipts manager. CRM server 40 may be in communication with storage 50. In some embodiments, storage 50 may be in the form of a database. In some embodiments, loyalty program manager 42 and/or receipts manager 44 are in communication with payment processing service 51. In some embodiments, loyalty program manager 42 and/or receipts manager 44 are in communication with back office manager 32.

Figure 8:
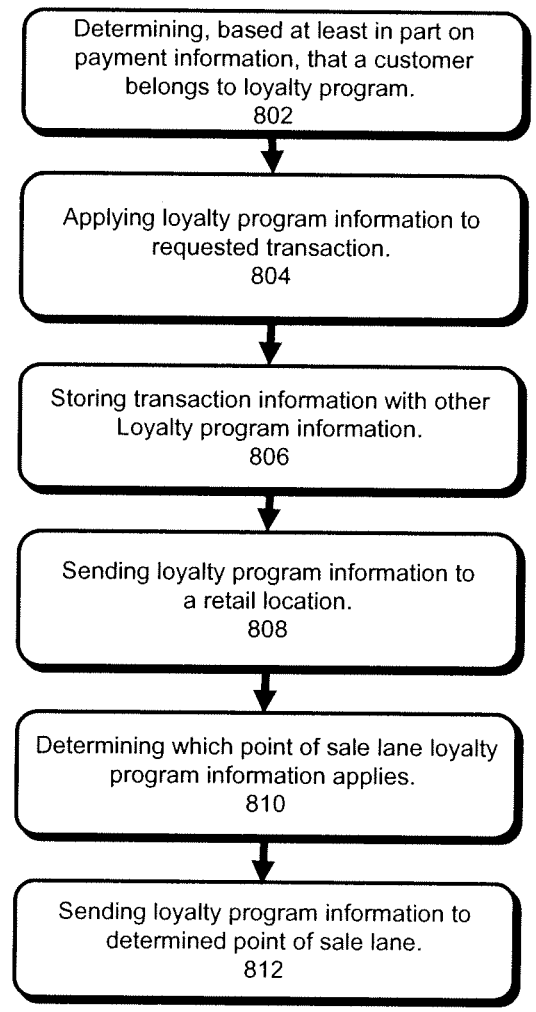
FIG. 8 is a flow diagram of a method for managing a loyalty program in conjunction with a method for processing payment transactions.

In reference now to FIG. 8, a method for managing customer relationships in the context of processing payment transactions is depicted. A determination 802 is made, based at least in part on payment information, that a customer belongs to a loyalty program. Loyalty program information is applied 804 to the requested transaction. Transaction information is stored 806 with other loyalty program information. Loyalty program information is sent 808 to a retail location. A determination 810 is made as to which point of sale lane loyalty program information applies. Loyalty program information is sent 812 to the determined point of sale lane.

Figure 9:
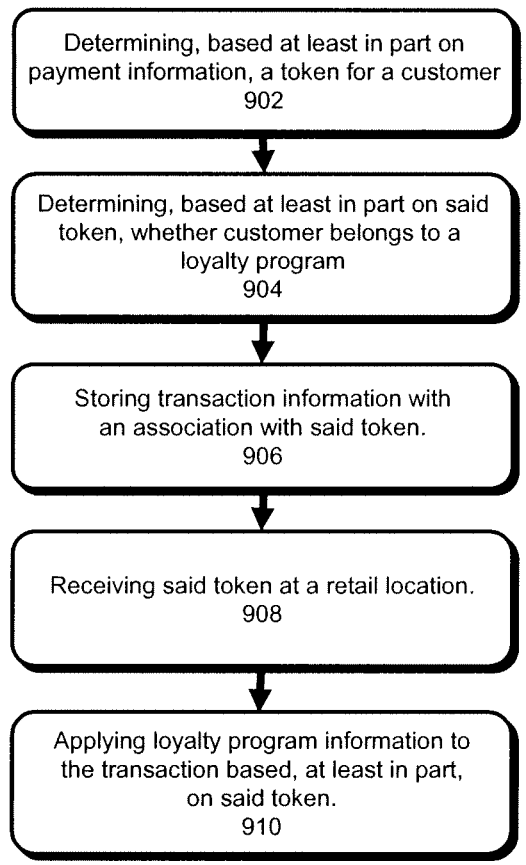
FIG. 9 is a flow diagram of a method for utilizing tokens to manage customer relationships in conjunction with a method for processing payment transactions.

In reference now to FIG. 9, a method for managing customer relationships in the context of processing payment transactions is depicted. A token for a customer is determined 902, based at least in part on payment information. A determination 904 is made, based at least in part on said token, as to whether a customer belongs to a loyalty program. Transaction information is stored 906 with an association to said token. Said token is received 908 at a retail location. Loyalty program information is applied 910 to a transaction based, at least in part, on said token. A token may be any computer readable identifier for a customer, including a data packet, address in memory, message, file, hash, or database entry.

What is claimed is:

1. A method for processing a payment transaction at retail locations, the method comprising:
   initiating, by a computing device at a retail location, a payment transaction;
   receiving, by the computing device at the retail location and for the payment transaction, non-payment card ("non-PCI") scope information in a form of a unique identifier via a mobile device;
   determining, by a remotely located payment processing server, that the payment transaction is authorized based at least in part on said non-PCI scope information in the form of the unique identifier received via the mobile device; and receiving, by the computing device at the retail location, an authorization for the payment transaction from the remotely located payment processing server, the computing device at the retail location communicating with predefined electronic devices at the retail location via an isolated communication port designated for communication between the computing device and the predefined electronic devices at the retail location;

wherein the payment transaction is processed without relying on payment card scope information at the retail location.

2. The method of claim 1, further comprising:
determining, at the retail location, that the authorization for the payment transaction is associated with a particular point of sale lane of a plurality of point of sale lanes at the retail location.

3. The method of claim 2, further comprising:
sending the authorization to the particular point of sale lane associated with the payment transaction.

4. The method of claim 1, wherein said non-PCI scope information in the form of the unique identifier is associated with a customer loyalty program.

5. The method of claim 4, further comprising:
applying customer loyalty program information to the payment transaction based, at least in part, on said non-PCI scope information in the form of the unique identifier.

6. A computing device for processing payments at retail locations, the computing device comprising:
at least one processor; and
a memory communicatively coupled to the at least one processor and storing computer-executable instructions, the computer-executable instructions, when executed by the at least one processor, cause the computing device to:
initiate a payment transaction at a retail location;
receive, for the payment transaction, non-payment card ("non-PCI") scope information in the form of a unique identifier from a mobile device;
receive, from a remotely located payment processing server, an authorization for the payment transaction, wherein said authorization was determined by said remotely located payment processing server based, at least in part, on said non-PCI scope information in the form of the unique identifier received via the mobile device, the computing device at the retail location communicating with predefined electronic devices at the retail location via an isolated communication port designated for communication between the computing device and the predefined electronic devices at the retail location; and
wherein the payment transaction is processed without relying on payment card scope information at the retail location.

7. The computing device of claim 6, wherein the authorization for the payment transaction is associated with a particular point of sale lane of a plurality of point of sale lanes at the retail location.

8. The computing device of claim 7, wherein the authorization is sent to the particular point of sale lane associated with the payment transaction.

9. The computing device of claim 7, wherein said non-PCI scope information in the form of the unique identifier is associated with a customer loyalty program.

10. The computing device of claim 9, wherein customer loyalty program information is applied to the payment transaction based, at least in part, on said non-PCI scope information in the form of the unique identifier.

11. A non-transitory computer-readable storage medium with computer readable instructions stored thereon, the computer readable instructions, when executed by a computing device, cause the computing device to perform a method for processing a payment transaction, the method comprising:
initiating, by the computing device at a retail location, a payment transaction;
receiving, by the computing device at the retail location and for the payment transaction, non-payment card ("non-PCI") scope information in the form of a unique identifier via a mobile device;
determining, by a remotely located payment processing server, that the payment transaction is authorized based at least in part on said non-PCI scope information in the form of the unique identifier received via the mobile device; and
receiving, by the computing device at the retail location, an authorization for the payment transaction from the remotely located payment processing server, the computing device at the retail location communicating with predefined electronic devices at the retail location via an isolated communication port designated for communication between the computing device and the predefined electronic devices at the retail location;
wherein the payment transaction is processed without relying on payment card scope information at the retail location.

12. The non-transitory computer-readable storage medium of claim 11, wherein the computer readable instructions, when executed by the computing device, further cause the computing device to perform a method further comprising:
determining, at the retail location, that the authorization for the payment transaction is associated with a particular point of sale lane of a plurality of point of sale lanes at the retail location.

13. The non-transitory computer-readable storage medium of claim 12, wherein the computer readable instructions, when executed by the computing device, further cause the computing device to perform a method further comprising:
sending the authorization to the particular point of sale lane associated with the payment transaction.

14. The non-transitory computer-readable storage medium of claim 11, wherein said non-PCI scope information in the form of the unique identifier is associated with a customer loyalty program.

15. The non-transitory computer-readable storage medium of claim 11, wherein the computer readable instructions, when executed by the computing device, further cause the computing device to perform a method further comprising:
applying customer loyalty program information to the payment transaction based, at least in part, on said non-PCI scope information in the form of the unique identifier.

16. The method of claim 1, wherein:
connection between the computing device and the predefined electronic devices at the retail location is limited to the isolated communication port.

17. The computing device of claim 6, wherein connection between the computing device and the predefined electronic devices at the retail location is limited to the isolated communication port.

18. The non-transitory computer-readable storage medium of claim 11, wherein the connection between the computing device and the predefined electronic devices at the retail location is limited to the isolated communication port.

* * * * *